(12) United States Patent
Murphy

(10) Patent No.: US 8,022,838 B2
(45) Date of Patent: Sep. 20, 2011

(54) LOGGING SYSTEM, METHOD OF LOGGING AN EARTH FORMATION AND METHOD OF PRODUCING A HYDROCARBON FLUID

(75) Inventor: Eugene Andrew Murphy, Houston, TX (US)

(73) Assignee: Thrubit B.V. (NL)

( * ) Notice: Subject to any disclaimer, the term of this patent is extended or adjusted under 35 U.S.C. 154(b) by 791 days.

(21) Appl. No.: 11/553,282

(22) Filed: Oct. 26, 2006

(65) Prior Publication Data
US 2007/0126595 A1 Jun. 7, 2007

Related U.S. Application Data

(60) Provisional application No. 60/731,173, filed on Oct. 28, 2005.

(51) Int. Cl.
*G01V 1/00* (2006.01)
(52) U.S. Cl. ............. 340/853.3; 166/254.2; 166/250.01
(58) Field of Classification Search .............. 166/254.2, 166/250.01; 175/24, 50
See application file for complete search history.

(56) References Cited

U.S. PATENT DOCUMENTS

| | | | |
|---|---|---|---|
| 5,111,880 A | 5/1992 | Wittrisch et al. | |
| 5,128,901 A | 7/1992 | Drumheller | 367/82 |
| 5,222,049 A | 6/1993 | Drumheller | 367/82 |
| 5,477,505 A | 12/1995 | Drumheller | 367/82 |
| 5,703,836 A | 12/1997 | Drumheller | 367/165 |
| 6,147,932 A | 11/2000 | Drumheller | 367/165 |
| 6,188,647 B1 | 2/2001 | Drumheller | 367/165 |
| 6,670,880 B1 | 12/2003 | Hall et al. | 336/132 |
| 6,727,827 B1 * | 4/2004 | Edwards et al. | 340/854.9 |
| 6,956,991 B2 | 10/2005 | Madsen | 385/27 |
| 7,134,493 B2 * | 11/2006 | Runia | 166/254.2 |
| 2003/0151977 A1 * | 8/2003 | Shah et al. | 367/82 |
| 2004/0074639 A1 | 4/2004 | Runia | 166/254.2 |
| 2004/0145492 A1 | 7/2004 | Hall et al. | 340/854.3 |
| 2004/0163822 A1 | 8/2004 | Zhang et al. | 166/380 |

(Continued)

FOREIGN PATENT DOCUMENTS

GB 2318372 A 4/1998

(Continued)

OTHER PUBLICATIONS

DOE—Industry Breakthrough Turns Drilling System Into Lighting Fast Computer Network Issued on: Sep. 30, 2002 by DOE—Fossil Energy Techline.
Brochure: Smart Drill Pipe—Revolutionizing The Industry by U.S. Department of Energy, Office of Fossil Energy, National Energy Technology Laboratory.

(Continued)

*Primary Examiner* — Albert K Wong
*Assistant Examiner* — Hung Q Dang
(74) *Attorney, Agent, or Firm* — Conley Rose, P.C.

(57) ABSTRACT

A logging system for use in a wellbore formed in an earth formation. A tubular conduit is provided extending from surface into the wellbore, as well as a surface communication and control device located at the surface. A telemetry device located inside the wellbore is capable of sending and receiving signals to and/or from the surface communication and control device, the signals representing commands and/or data. Also provided is a logging tool string that is capable of passing from a position within the conduit to a position outside the conduit at a lower end part thereof and capable of being suspended by the conduit in said position outside the conduit. Communication of the commands and/or data between the logging tool string and the telemetry device is established using a communication interface between the logging tool string and the telemetry device.

19 Claims, 3 Drawing Sheets

U.S. PATENT DOCUMENTS

2005/0152219 A1    7/2005    Garcia-Osuna et al. ........ 367/25
2005/0173128 A1    8/2005    Hall et al. ..................... 166/380

FOREIGN PATENT DOCUMENTS

| WO | WO0017488 | 3/2000 |
|---|---|---|
| WO | WO2004/063522 | 7/2004 |

OTHER PUBLICATIONS

Brochure: High Speed Drill String Telemetry Technology bt The IntelliServ Network A Grant Prideco Company.

PCT/US2006/041769, International Search Report dated Nov. 19, 2007.

* cited by examiner

LOGGING SYSTEM, METHOD OF LOGGING AN EARTH FORMATION AND METHOD OF PRODUCING A HYDROCARBON FLUID

CROSS REFERENCE TO EARLIER APPLICATIONS

The present application claims priority benefits of U.S. Provisional application No. 60/731,173 filed 28 Oct. 2005.

FIELD OF THE INVENTION

In one aspect, the present disclosure relates to a logging system for use in a wellbore formed in an earth formation. In another aspect, the disclosure relates to a method of logging the earth formation. In still another aspect, the disclosure relates to a method of producing a hydrocarbon fluid.

BACKGROUND OF THE INVENTION

US published patent application 2004/0074639 describes a logging system for use in a wellbore wherein a tubular conduit extends from surface into the wellbore. The tubular conduit contains a body of wellbore fluid. A pressure pulse device is arranged together with a logging tool string within the same conduit. The pressure pulse device generates pressure pulses in the body of the wellbore fluid, which pressure pulses represent data communicated by the logging tool string to the pressure pulse device during logging of the logging tool string. These pressure pulses are detected by a control system at surface.

The operator is thereby in a position to evaluate the functioning of the logging tool string during the logging operation, and to take appropriate measures at an early stage if necessary.

SUMMARY OF THE INVENTION

In one aspect of the invention, there is provided a logging system for use in a wellbore formed in an earth formation, comprising
 a tubular conduit extending from surface into the wellbore;
 a surface communication device located at the surface;
 a telemetry device inside the wellbore, capable of sending and receiving signals to and/or from the surface communication device, the signals representing commands and/or data;
 a logging tool string capable of passing from a position within the conduit to a position outside the conduit at a lower end part thereof and capable of being suspended in said position outside the conduit;
 a communication interface between the logging tool string and the telemetry device for providing in communication of the commands and/or data between the logging tool string and the telemetry device.

In another aspect of the invention, there is provided a method of logging an earth formation in the vicinity of a wellbore formed in the earth formation, comprising
 lowering of a tubular conduit from surface into the wellbore;
 lowering of a telemetry device in the wellbore;
 passing a logging tool string from a position within the conduit to a position outside the conduit at a lower end part thereof and suspending the logging tool string in said position outside the conduit;
 inducing the logging tool string to log the earth formation;
 establishing communication of data and/or commands between the logging tool string and the telemetry device;
 sending and receiving signals between a surface communication device and the telemetry device, the signals representing the commands and/or data.

Subsequently to these steps, a flow of a hydrocarbon fluid may be induced from the earth formation into and through the wellbore as a part of a method of producing a hydrocarbon fluid from the earth formation.

The invention will be described hereinafter in more detail by way of example and with reference to the accompanying drawings.

BRIEF DESCRIPTION OF THE DRAWINGS

In the drawings.

In the Figures like reference numerals relate to like components.

DETAILED DESCRIPTION OF EMBODIMENTS

There is provided a logging system for use in a wellbore formed in an earth formation, comprising
 a tubular conduit extending from surface into the wellbore;
 a surface communication device located at the surface;
 a telemetry device inside the wellbore, capable of sending and receiving signals to and/or from the surface communication device, the signals representing commands and/or data; and
 a logging tool string capable of passing from a position within the conduit to a position outside the conduit at a lower end part thereof and capable of being suspended in said position outside the conduit. A communication interface may be provided between the logging tool string and the telemetry device for providing in communication of the commands and/or data between the logging tool string and the telemetry device.

The logging tool string may thereby communicate logging data to the surface communication and control device via the telemetry device.

The logging tool string may communicate commands to the surface communication and control device via the telemetry device. The communication device may comprise or be coupled to a control device capable of controlling one or more operational parameters on surface, such that an operator intervention may not be needed in all instances to take appropriate measures.

The surface communication and control device may send commands to the logging tool string via the telemetry device, for instance to control a logging operation. The communication device may comprise or be coupled to a control device capable of controlling one or more operational parameters relevant for the logging tool string, such that an operator intervention may not be needed in all instances to take appropriate measures.

Accordingly, the ability to send and receive commands to and/or from the logging tool string downhole in the wellbore may give rise to significant saving of valuable time.

Figure 1:
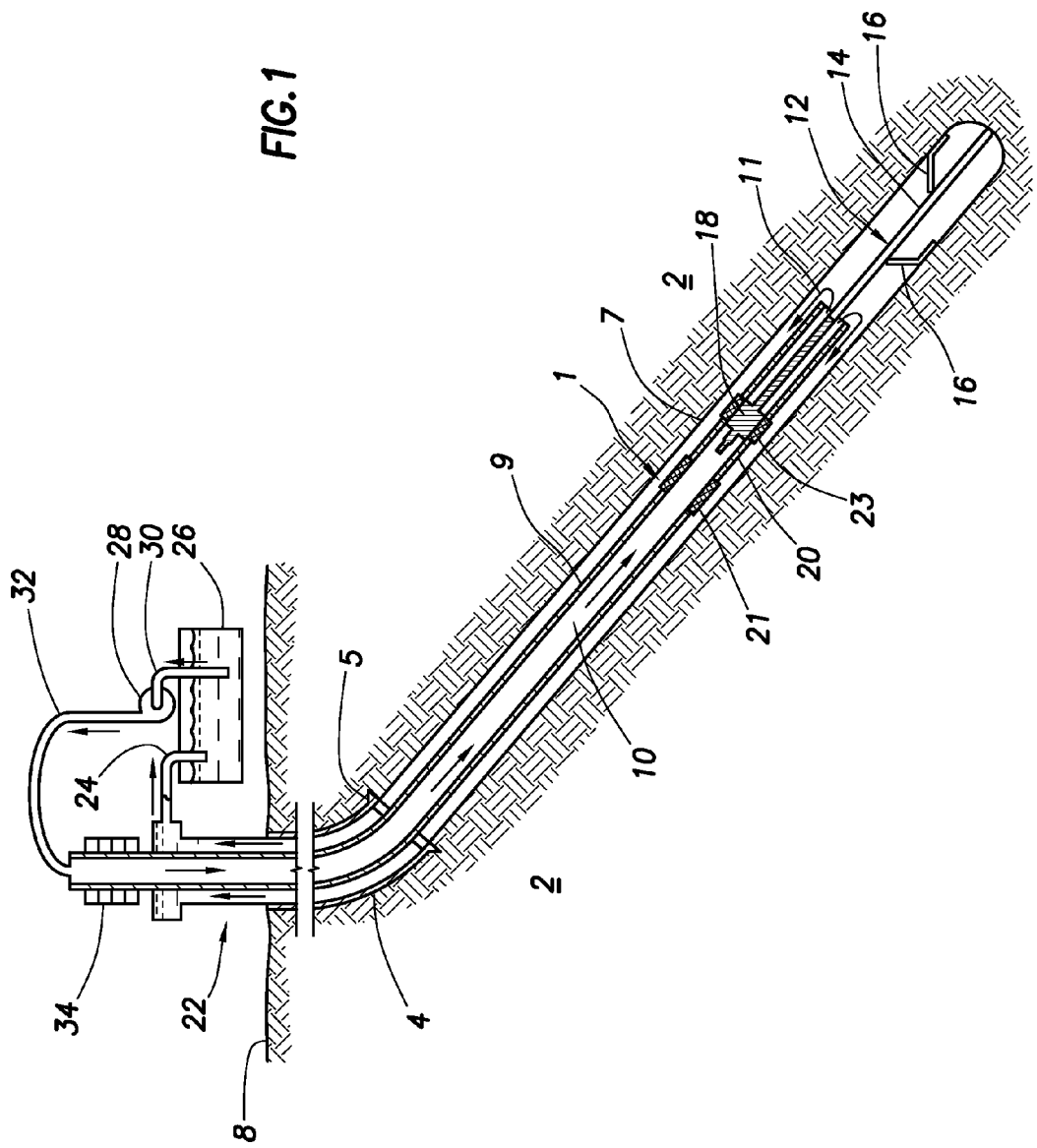
FIG. 1 schematically shows a first embodiment of the logging system and method according to the invention, using a casing extending in the wellbore.

Referring to FIG. 1 there is shown a wellbore 1 formed in an earth formation 2. The wellbore may be filled with a drilling fluid or a hydrocarbon fluid or another fluid. The wellbore 1 has an upper portion 4 provided with a casing 6 extending from a drilling rig or a production facility (not shown) at surface 8 into the wellbore 1 to a casing shoe 5, and an open lower portion 7 extending below the casing shoe 5.

A tubular conduit 9 extends from the surface 8 into the wellbore 1 whereby an open lower end 11 is arranged in the open lower portion 7 of the wellbore 1. Also the tubular conduit 9 may contain a fluid, such as for instance the same fluid that fills the wellbore 1. A wellhead 22 is connected to the upper end of the casing 5. The wellhead 22 may be connected to a production facility, but as shown in FIG. 1 it is provided with an outlet conduit 24 debauching in a fluid reservoir 26 which may be provided with a suitable sieve means (not shown) for removing particulates from the fluid. A pump 28 having an inlet 30 and an outlet 32 may be arranged to pump a fluid from the fluid reservoir 26 into the upper end of the tubular conduit 9.

A logging tool string 12, capable of passing through the tubular conduit 9 by being lowered or raised through the tubular conduit 9, is retrievably suspended in the tubular conduit 9 by suitable means (not shown). Suitable means may include a wire line or a gripping mechanism. In the embodiment as shown in FIG. 1, the upper end of the logging tool string 12 is provided with a latch 20 for latching of a wireline (not shown) to the logging tool string 12.

In one embodiment as described now, the logging tool string 12 comprises a repeat formation tester (RFT) tool 14 having retractable arms 16, and a first member 18 of a communication interface arranged at the upper side of the RFT tool 14.

Inside the wellbore 1 is a telemetry device 21. The telemetry device 21 is capable of sending and receiving signals back and forth to and/or from a surface communication device 34, which is located at the surface 8. Such a communication device may in embodiments also comprise or be coupled to a control device. In the following, reference will be made to a communication device in the form of a communication and control device 34.

In the embodiment as shown in FIG. 1, the telemetry device 21 is mechanically coupled to the tubular conduit 9, as is the sending and receiving part of the surface communication and control device 34.

Coupled to the telemetry device 21, or part thereof, is a second member 23 of the communication interface. The communication interface establishes a capability of transmitting and receiving data and/or commands back and forth between the telemetry device 21 and the logging tool string 12.

The logging tool string 12 is capable of passing from a position within the tubular conduit 9 to a position outside the tubular conduit 9 where it can be suspended by the tubular conduit 9. This is the position showing in FIG. 1. The RFT tool 14 extends below the lower end part 11 of the tubular conduit 9 and the first member 18 of the communication interface is arranged within the tubular member 9. In the embodiment of FIG. 1, the first member 18 aligns with the second member 23 of the communications interface to enable communication.

The RFT tool 14 may be powered by a battery (not shown) and may optionally be provided with an electronic memory (not shown) for storing logging data. Electric signals transmitted by the RFT tool 14 and/or the telemetry device 21 can be communicated from the first member 18 to the second member 23 of the communication interface and vice versa. These signals may represent commands and/or data comprising logging data produced by the RFT tool 14 during logging of the earth formation 2.

A control system 34 located at surface is connected to the tubular conduit 9 for sending or receiving signals representing the commands and/or data back and forth to the telemetry device 21.

Figure 2:
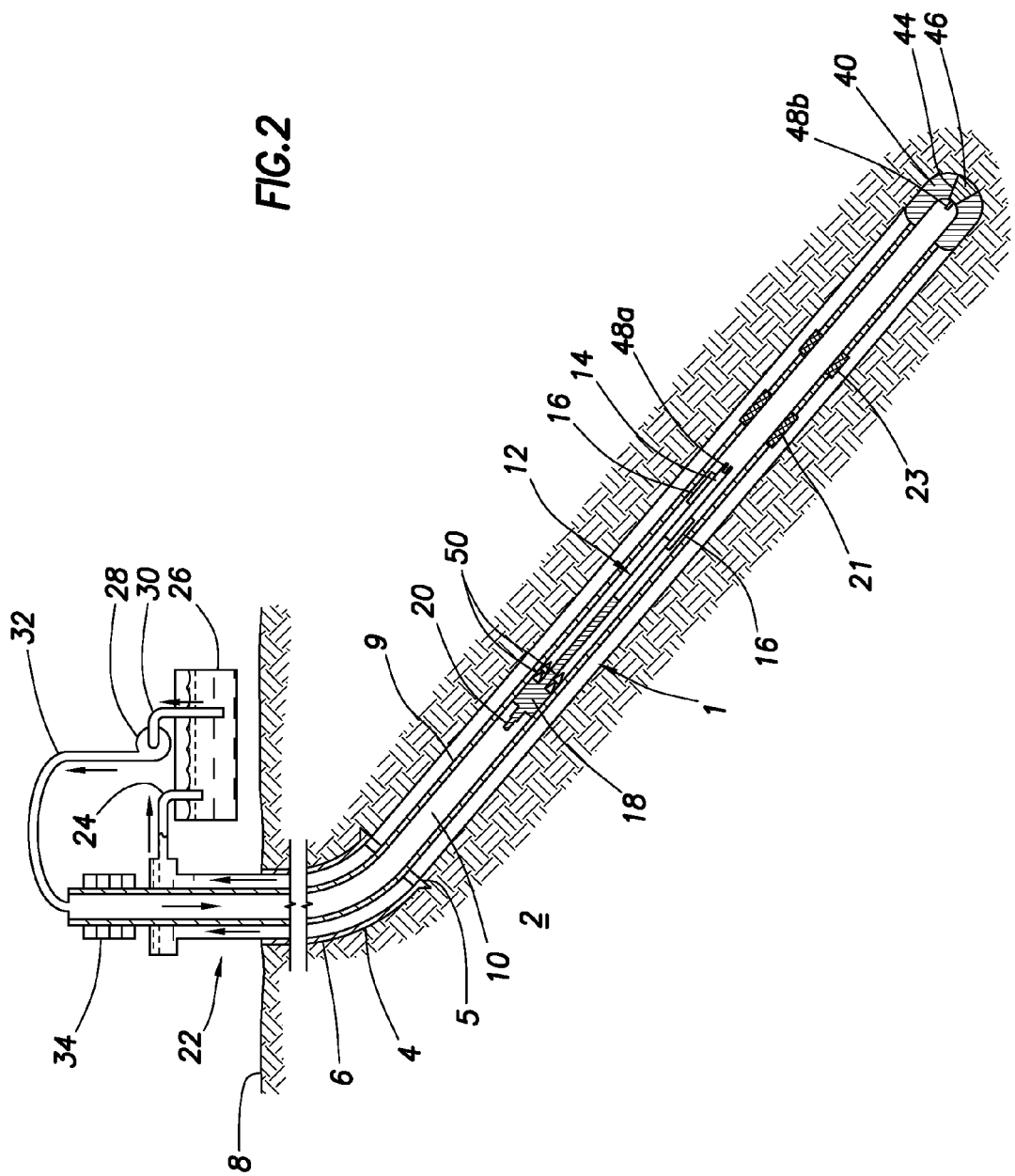
FIG. 2 schematically shows a second embodiment of the logging system and method according to the invention, using a drill string extending in the wellbore.

The second embodiment shown in FIG. 2 is largely similar to the first embodiment, except with respect to the following aspects. The tubular conduit 9 is provided in the form of a drill string, comprising a drill bit 40 attached at the lower end thereof. The logging tool string 12 is shown as being lowered through the drill string 9. The drill bit 40 is provided with a passage 44 in fluid communication with the interior of the drill string 9, which passage 44 is provided with a closure element 46 removable from the passage 44 in outward direction. The lower end of the logging tool string 12 and the upper end of the closure element 46 are provided with respective co-operating latching members 48a, 48b capable of latching the logging tool string 12 to the closure element 46. These co-operating latching members 48a, 48b may be designed as set out in International publication WO2004/063522 which is incorporated herein by reference.

In addition, closure element 46 has a latching mechanism (not shown) for latching the closure element 46 to the drill bit 40. The latching mechanism is arranged to co-operate with the latching members 48a, 48b in a manner that the closure element 46 unlatches from the drill bit 40 upon latching of latching member 48a to latching member 48b, and that the closure element 46 latches to the drill bit 40, and thereby closes passage 44, upon unlatching of latching member 48a from latching member 48b. A detailed embodiment of the latching of the closure element 46 with the drill bit 40 can also be found in International publication WO2004/063522.

Furthermore, the logging tool string 12 may be provided with pump cups 50 for pumping the logging tool string 12 through the drill string, either in downward or upward direction thereof, and/or a latch 20 for latching of a wireline (not shown) to the logging tool string 12.

Figure 3:
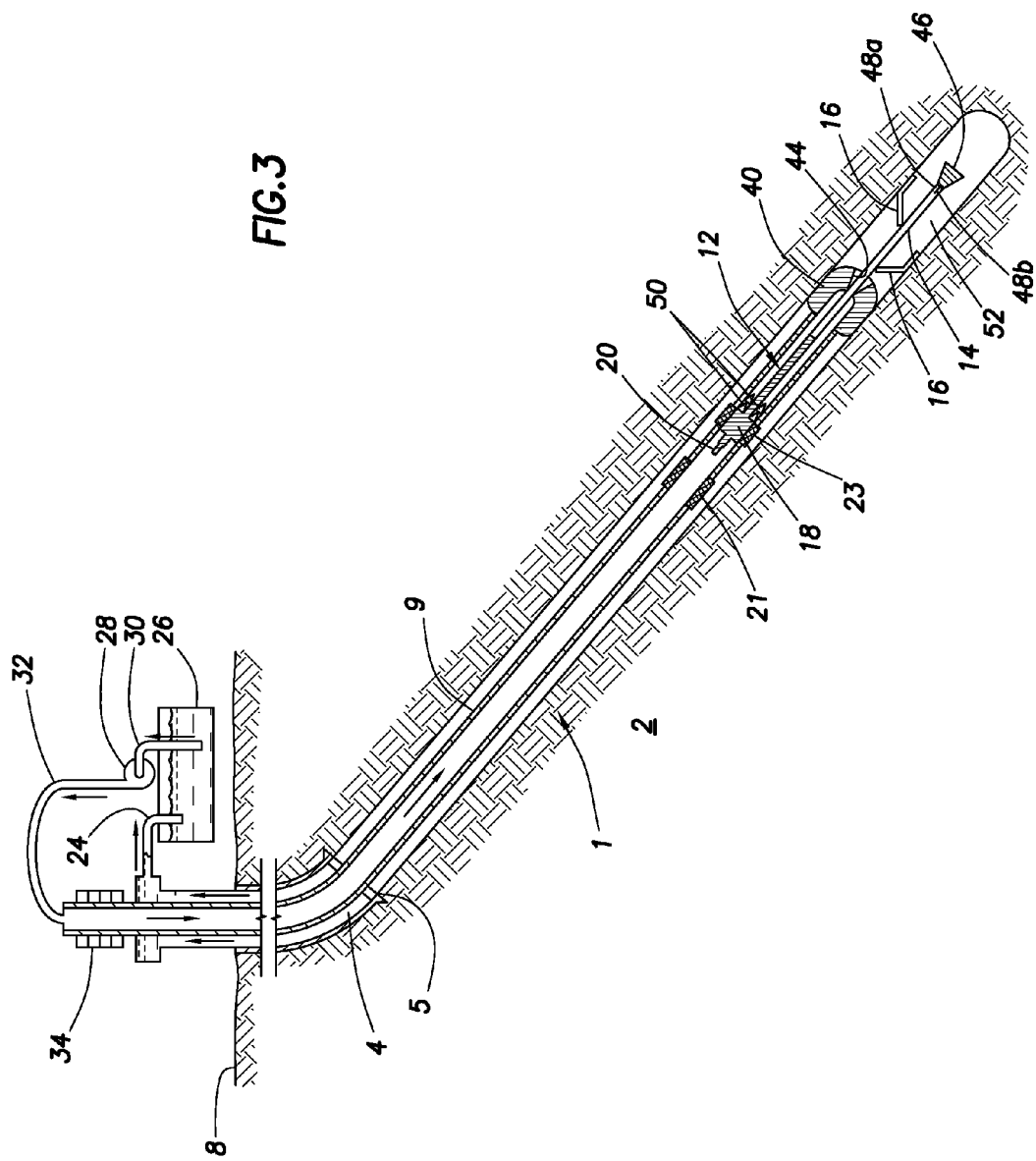
FIG. 3 schematicaly shows the embodiment of FIG. 2 during a further stage of operation.

In FIG. 3 is shown the embodiment of FIG. 2 during a further stage of operation whereby the logging tool string 12 has been latched to the closure element 46 and the closure element 46 has been unlatched from the drill bit 40. The drill string 9 has been raised a selected distance in the wellbore 1 so as to leave a space 52 between the drill bit 40 and the wellbore bottom. The logging tool string 12 is suspended by the drill string 9, in a manner that the RFT tool 14 extends through the passage 44 to below the drill bit 40, and that the first member 18 of the communication interface is arranged within the drill string 9 aligned with the second member 23. The closure element 46 consequently extends below the logging tool string 12.

In each of the above described embodiments, the communications interface between the logging tool string 12 and the telemetry device 21 may a wireless based communication such as radio frequency transmissions, electromagnetic frequency transmissions, inductive couplings and capacitance couplings. Alternatively, the communication interface may comprise a plug and socket arrangement that mate or interconnect when the logging tool string 12 is suspended by the conduit 9 in the position outside the conduit 9. It may include wiring across tool joints.

The transmission line for transmitting the signals between the telemetry device and the surface communication device may be integral to the tubular conduit such as is described in for instance U.S. Pat. No. 6,670,880, US patent application publication numbers 2004/0145492 and 2005/0173128, each of which is hereby incorporated by reference.

The tubular conduit itself may be utilized for the transmission of signals between the surface communication device 34 and the telemetry device 21. Grant Prideco, for instance, markets a system known as "Intellipipe" wherein the tubular conduit itself is employed to provide for high data rate telemetry. Another such system is disclosed in US patent application publication number 2004/0163822, which is incorporated herein by reference.

Another embodiment wherein the tubular conduit forms a transmission line for transmitting the signals between the telemetry device and the surface communication device may be based on acoustic transmission through the material of which the tubular conduit 9 is made.

Such acoustic transmission would require the telemetry device and the surface communication device to both comprise an acoustic transducer, one for generating the acoustic signals the other for picking up the acoustic signals from the tubular conduit. Such an acoustic transducer may typically comprise a piezo ceramic stack contained in the body of the telemetry device and the surface communication device, respectively. The surface communication device may be clamped onto a drill string rotating drive mechanism such as a top drive or a swivel.

In acoustic transmission, signals generated by the telemetry device 21 or the surface communication device 34 are conveyed to surface or to downhole by the steel of the drill string 9. The information contained in the received signals is then extracted and presented in a useable format.

The acoustic signals may be generated at all times during drilling and tripping operations. The signals are independent of rig hydraulics (unlike mud pulse telemetry) and formation effects (unlike electromagnetic telemetry).

Suitable acoustic systems are disclosed in US patent application publication no 2005/0152219 and U.S. Pat. Nos. 5,128,901; 5,222,049; 5,477,505; 6,147,932; 6,188,647, and 6,956,991. Particularly suitable are telemetry devices that allow an open bore for the logging tool string 12 to pass through, such as the one described in U.S. Pat. No. 6,956,991, incorporated herein by reference.

During normal operation of the embodiment of FIG. 1, the drill string 9 is lowered into the wellbore 1 until the lower end 11 of the conduit 9 is positioned in the open wellbore portion 7. Next the logging tool string 12 is lowered from surface through the conduit 9 by means of a wireline (not shown) latched to the logging tool string 12 at latch 20, whereby during lowering the arms 16 are retracted. Lowering continues until the RFT tool 14 extends below the tubular conduit 9 while the first member 18 of the communication interfaced is positioned within the tubular conduit 9 mated with the second member 23 of the communication interface. In this position the logging tool string 12 is suitably supported. The arms 16 are then extended against the wall of the wellbore 1 and the RFT tool 14 is induced to log the earth formation 2. More details on what happens during logging the earth formation 2 will follow below.

After the logging run has been completed, the logging tool string 12 is retrieved through the tubular conduit 9 to surface by wireline connected to latch 20. Optionally the tubular conduit 9 is then also removed from the wellbore 1.

During normal operation of the embodiment of FIGS. 2 and 3, the drill string 9 is operated to drill the lower wellbore portion 7 whereby the closure element 46 is latched to the drill bit 40 so as to form a part thereof.

When it is desired to log the earth formation 2 surrounding the open wellbore portion 7, the logging tool string 12 may be pumped down the drill string 9 using pump 28 until the logging tool string 12 latches to the closure element 46 by means of latching members 48a, 48b. During lowering of the string 12, the arms 16 of the RFT tool are retracted. Then the drill string 9 may be raised a selected distance until there is sufficient space below the drill string for the RFT tool 14 and the closure element 46 to extend below the drill bit 40. Of course, the raising of the drill string 9 may also be done prior to or during the lowering of the logging tool string 12.

Upon latching of latching member 48a to latching member 48b, the closure element 46 unlatches from the drill bit 40 for instance in the way as described in WO2004/063522. Continuous operation of pump 28 causes further downward movement of the combined logging tool string 12 and closure element 46 until the logging tool string 12 becomes suspended by the drill string 9. In this position (shown in FIG. 3) the RFT tool 14 extends through the passage 44 into the space 52 below the drill bit 40, and the first member 18 aligns with the second member 23 of the communication interface.

The arms 16 are then extended against the wall of the wellbore and the RFT tool 14 is induced to log the earth formation 2.

After logging has been completed, the logging tool string 12 is retrieved to surface through the drill string 9 by wireline connected to latch 20. During retrieval the closure element 46 latches to the drill bit 40 (thereby closing the passage 44) and the latching members 48a, 48b unlatch. Alternatively the logging tool string can be retrieved to surface by reverse pumping of drilling fluid, i.e. pumping of drilling fluid down through the annular space between the drill string 9 and the wellbore wall and into the lower end of the drill string 9. Optionally a further wellbore section then can be drilled, or the drill string 9 can be removed from the wellbore 1.

Common to operation of both embodiments is what happens during the logging of the earth formation 2 as described now.

In both embodiments (i.e. the embodiment of FIG. 1 and the embodiment of FIGS. 2 and 3), logging data and/or commands are transmitted by the RFT device 14 to the first member 18 of the communication interface in the form of electric signals representing the data and/or commands. Communication is established of the data and/or commands between the first member 18 and the second member 23 of the communication interface. Thus communication is established between the logging tool string 12 to and from the telemetry device 21. In addition, the logging data or part of the logging data may be stored in the optional electronic memory.

Simultaneously with operating the logging tool string 12, signals are sent and received by the telemetry device 21 to and from the surface communication In this manner the operator is in a position to monitor the logging operation and to take corrective action if necessary. It would also be possible for the surface communication and control device 34 to automatically issue commands to the logging tool string 12 or vice versa. For example, incorrect deployment of the arms 16 of the RFT tool can be detected and corrected in this manner at an early stage.

Instead of lowering the logging tool string from surface through the drill string, the logging tool string can be latched into a lower section of the drill string during lowering of the drill string into the wellbore. At the desired depth the logging tool string is then moved to the exterior of the drill string by, for example, pumping a ball or a dart down the drill string so as to activate the latch release mechanism of the logging tool string.

At the same time, the lower end 11 of the tubular conduit 9 may be equipped with a communication interface allowing communication with tools other than the logging tools, such as including rotary steerable tools, logging while drilling tools.

As illustrated above, there is the ability to exchange data and/or commands between surface and a logging tool suspended downhole.

This provides ability to send commands to, receive commands from, send data to and access data from a string of wireline tools suspended through a tubular conduit and in particular of through-bit tools deployed through the drilling bit and in communication via the downhole communications interface. Examples of the use of this functionality include:

verifying that a string of logging tools are working properly while tripping to acquire formation evaluation data;

commanding a formation testing tool to open and then to close during formation pressure testing operations monitoring a downhole fluid sampler and commanding the sample chamber when to open and close initiating, monitoring and terminating sidewall coring with a rotary sidewall coring device;

ability to take time-of-flight measurements for the acoustic signal in steel travelling between the surface and the telemetry device, and to convert this time into tubular length. The length derived can then be used to give the length of the length of the tubular conduit.

The logging tool string for the purposes of the present specification is understood to include also other types of tool strings effective to perform functions other than or in addition to logging.

The invention claimed is:

1. A logging system for use in a wellbore formed in an earth formation, comprising
    a tubular conduit extending from surface into and not fixed within the wellbore;
    a surface communication device located at the surface;
    a telemetry device installed in the tubular conduit and positionable inside the wellbore, capable of sending and receiving signals to and/or from the surface communication device, the signals representing commands and/or data;
    a logging tool string capable of passing from a position within the conduit to a position outside the conduit at a lower end part thereof and capable of being suspended in said position outside the conduit; and
    a communication interface between the logging tool string and the telemetry device, comprising:
        a first member installed in the logging tool string and moveable relative to the tubular conduit;
        a second member installed in the tubular conduit separate from the logging tool string, the first member, and the telemetry device, and
    the first member alignable within at least a portion of the second member to enable communication of the commands and/or data between the logging tool string and the telemetry device when the tubular conduit is moveable within the wellbore.

2. The logging system of claim 1, wherein the telemetry device is mechanically coupled to the tubular conduit.

3. The logging system of claim 1, wherein the telemetry device provides a bore capable of accommodating the logging tool string to pass through the telemetry device.

4. The logging system of claim 1, wherein the telemetry device is provided with a central conduit capable of accommodating the logging tool string.

5. The logging system of claim 1, wherein the tubular conduit forms a transmission line for transmitting the signals between the telemetry device and the surface communication device.

6. The logging system of claim 1, wherein the telemetry device comprises an acoustic telemetry device capable of transmitting an acoustic signal along the tubular conduit and/or receiving an acoustic signal that has propagated along the tubular conduit.

7. The logging system of claim 1, wherein the communication interface establishes a wireless communication.

8. The logging system of claim 1, wherein the communication interface comprises a plug and socket arrangement interconnecting when the logging tool string is suspended in the position outside the conduit.

9. The logging system of claim 1, wherein the tubular conduit is one of a wellbore casing and a drill string.

10. The logging system of claim 1, wherein the tubular conduit is a drill string for drilling the wellbore, and the logging tool string is suspended in a manner that the logging tool string extends below the drill string and in an open part of the wellbore.

11. The logging system of claim 1, wherein the tubular conduit is a drill string for drilling the wellbore whereby the drill string includes a drill bit having a passage for passage therethrough of the logging tool string, and wherein the logging tool string is suspended in a manner that part of the logging tool string extends in said passage.

12. The logging system of claim 1, wherein the telemetry device is comprised in a measurement while drilling (MWD) device.

13. The logging system of claim 1, wherein the surface communication device is coupled to a control device.

14. The logging system of claim 13, wherein the communication device comprises the control device.

15. The logging system of claim 1, wherein the logging tool string is capable of being suspended by the tubular conduit in said position outside the conduit.

16. A method of logging an earth formation in the vicinity of a wellbore formed in the earth formation, comprising:
    lowering of a tubular conduit from surface into the wellbore;
    lowering of a telemetry device installed in the tubular conduit into the wellbore;
    passing a logging tool string from a position within the conduit to a position outside the conduit at a lower end part thereof and suspending the logging tool string in said position outside the conduit;
    inducing the logging tool string to log the earth formation when the tubular conduit is movable in the welbore;
    establishing communication of data and/or commands between the logging tool string and the telemetry device with a communication interface, the interface comprising:
        a first member installed in the logging tool string and moveable relative to the tubular conduit;
        a second member installed in the tubular conduit separate from the logging tool string, the first member, and the telemetry device; and
        wherein establishing communication comprises aligning the first member at least partially within the second member to enable the communication; and
    sending and receiving signals between a surface communication device and the telemetry device through the first and second members, the signals representing the commands and/or data.

17. The method of claim 16, wherein the lowering of the tubular conduit and the lowering of the telemetry device are performed simultaneously.

18. The method of claim 16, wherein the tubular conduit is a drill string and the lowering of the tubular conduit is preceded by or accompanied by drilling a section of the wellbore with the drill string.

19. A method of producing a hydrocarbon fluid from an earth formation, comprising:

logging the earth formation in the vicinity of a wellbore formed in the earth formation where a tubular conduit and a telemetry device installed in the tubular conduit are lowered from surface into the wellbore and a logging tool string is passed from a position within the conduit to a position outside the conduit at a lower end part thereof and suspended in said position outside the conduit and induced to log the earth formation when the conduit is movable in the wellbore, and establishing communication of data and/or commands between the logging tool string and the telemetry device using a communication interface, comprising aligning a first member installed in the logging tool string and moveable relative to the tubular conduit at least partially within a second member installed in the tubular conduit separate from the logging tool string, the first member, and the telemetry device, and signals sent and received between a surface communication device and the telemetry device through the first and second members, the signals representing the commands and/or data; and subsequently inducing a flow of the hydrocarbon fluid through the wellbore.

* * * * *